United States Patent [19]

Kobayashi

[11] Patent Number: 5,733,978
[45] Date of Patent: Mar. 31, 1998

[54] CURABLE RESIN COMPOSITION

[75] Inventor: Akihiko Kobayashi, Chiba Prefecture, Japan

[73] Assignee: Dow Corning Toray Silicone Co., Ltd., Tokyo, Japan

[21] Appl. No.: 638,991

[22] Filed: Apr. 24, 1996

[30] Foreign Application Priority Data

Apr. 26, 1995 [JP] Japan ................................ 7-125714

[51] Int. Cl.$^6$ .................................................. C08F 1/00
[52] U.S. Cl. .......................... 525/100; 525/195; 525/196; 525/209; 525/478
[58] Field of Search .................................. 525/195, 196, 525/209, 478, 100

[56] References Cited

U.S. PATENT DOCUMENTS

| | | | |
|---|---|---|---|
| 4,761,452 | 8/1988 | Itoh et al. | 524/521 |
| 5,169,909 | 12/1992 | Okawa | 525/478 |
| 5,364,901 | 11/1994 | Nield et al. | 524/521 |
| 5,405,896 | 4/1995 | Fujiki et al. | 524/265 |
| 5,416,147 | 5/1995 | Takarada et al. | 524/399 |
| 5,424,374 | 6/1995 | Okami | 525/478 |
| 5,520,767 | 5/1996 | Larson | 156/307.5 |

FOREIGN PATENT DOCUMENTS

| | | |
|---|---|---|
| 431173 | 6/1991 | European Pat. Off. . |
| 29459 | 1/1989 | Japan . |

*Primary Examiner*—Edward J. Cain
*Attorney, Agent, or Firm*—Sharon K. Severance

[57] ABSTRACT

The introduction of a novel curable resin composition that is characterized by the ability to cure at temperatures at or above its melting-initiation temperature through the rapid, hydrosilylation-based formation of a crosslinked structure. Said curable resin composition comprising

- (A) an acrylic resin that has at least 2 silicon-bonded alkenyl groups in each molecule and a melting-initiation temperature of at least 40° C.;
- (B) an acrylic resin that has at least 2 hydrosilyl groups in each molecule and a melting-initiation temperature of at least 40° C., in a quantity that yields a value from 1:0.3 to 1:30 for the molar ratio of silicon-bonded alkenyl groups in component (A) to silicon-bonded hydrogen atoms in component (B); and
- (C) a hydrosilylation reaction catalyst in sufficient quantity to cure the composition.

13 Claims, No Drawings

CURABLE RESIN COMPOSITION

BACKGROUND OF THE INVENTION

Hydrosilylation-curing resin compositions based on various alkenyl-functional organic resins are known in the art. For example, Japanese Patent Application Laid Open [Kokai or Unexamined] Number Sho 64-29459 [29,459/1989] describes a curable resin composition comprising acrylic resin in the form of a copolymer of allyl methacrylate, SiH-functional polysiloxane, hydrosilylation curing catalyst, and organic solvent. European Patent Application No. 0 43 173 A1 describes a curable resin composition comprising SiH-functional polypropylene oxide, allyl ether-terminated polypropylene oxide, and hydrosilylation catalyst. In each of these curable compositions, however, the double bonds introduced into the organic resin have an allylic ester structure. Due to secondary reactions during hydrosilylation this allylic ester will produce unstable silyl ester bonds. These silyl ester bonds readily hydrolyze, with the result that time-dependent changes can occur in the physical properties of the cured product. In addition, the use of organic solvent is essential for the composition disclosed in Japanese patent Application Laid Open [Kokai or Unexamined] Number Sho64-29459. The elimination of this organic solvent makes it quite difficult to obtain a uniform cured product. Finally, none of these compositions can be used as the base resin of a reactive hot-melt adhesive.

It is therefore an object of the present invention to provide a curable resin composition that is highly adapted for application as the base resin of hot-melt adhesives.

SUMMARY OF THE INVENTION

This invention relates to a curable resin composition. More particularly, this invention relates to a novel curable resin composition that when heated simultaneously melts and cures through the development of a hydrosilylation-based crosslinking reaction. The curable resin composition comprises (A) an acrylic resin that has at least 2 silicon-bonded alkenyl groups in each molecule and that has a melting-initiation temperature of at least 40° C.; (B) an acrylic resin that has at least 2 hydrosilyl groups in each molecule and that has a melting-initiation temperature of at least 40° C., wherein (B) is present in a quantity to yield a molar ratio of silicon-bonded alkenyl groups in component (A) to silicon-bonded hydrogen atoms in component (B) of 1:0.3 to 1:30; and (C) a hydrosilylation reaction catalyst in sufficient quantity to cure the composition.

THE INVENTION

The present invention relates to a curable resin composition comprising (A) an acrylic resin that has at least 2 silicon-bonded alkenyl groups in each molecule and that has a melting-initiation temperature of at least 40° C.;

(B) an acrylic resin that has at least 2 hydrosilyl groups in each molecule and that has a melting-initiation temperature of at least 40° C., in a quantity that yields from 1:0.3 to 1:30 molar ratio of silicon-bonded alkenyl groups in component (A) to silicon-bonded hydrogen atoms in component (B); and (C) a hydrosilylation reaction catalyst in sufficient quantity to cure the composition.

Component (A) of the present invention is acrylic resin that contains at least 2 silicon-bonded alkenyl groups in each molecule. Component (A) must be a solid at ambient temperature and have a melting-initiation temperature must be at least 40° C. As used herein, the melting-initiation temperature is the temperature at which the solid acrylic resin softens and exhibits fluidity. Generally, it will be the same as or somewhat higher than the softening point or heat-distortion temperature. Component (A) preferably has a weight-average molecular weight of 500 to 500,000 and more preferably of 5,000 to 100,000. The chemical structure of component (A) may be straight chain or branched.

Acrylic resin (A) can be prepared by the copolymerization of acrylic or methacrylic (hereinafter alternatively referred to as "(meth)acrylic") monomer with heterodifunctional oligosilane (a') that contains both alkenyl and (meth)acrylic functionalities within the same molecule. Said (meth)acrylic monomer is exemplified by methyl acrylate, ethyl acrylate, n-butyl acrylate, isobutyl acrylate, cyclohexyl acrylate, 2-ethylhexyl acrylate, methyl methacrylate, ethyl methacrylate, n-butyl methacrylate, isobutyl methacrylate, cyclohexyl methacrylate, 2-ethylhexyl methacrylate, and others. The use of methacrylic monomers is preferred.

The heterodifunctional oligosiloxane (a') may be represented by compounds having the following formula:

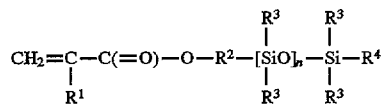

wherein $R^1$ is hydrogen or methyl; $R^2$ is a divalent hydrocarbon group such as ethylene, propylene, and others; $R^3$ is an alkyl group, such as methyl, ethyl, propyl, and others, or an aryl group; $R^4$ is an alkenyl group such as vinyl, allyl, and others with vinyl being preferred; and n is an integer from 1 to 5.

Heterodifunctional oligosiloxane (a') is specifically exemplified by, but not limited to, compounds with the following chemical structures:

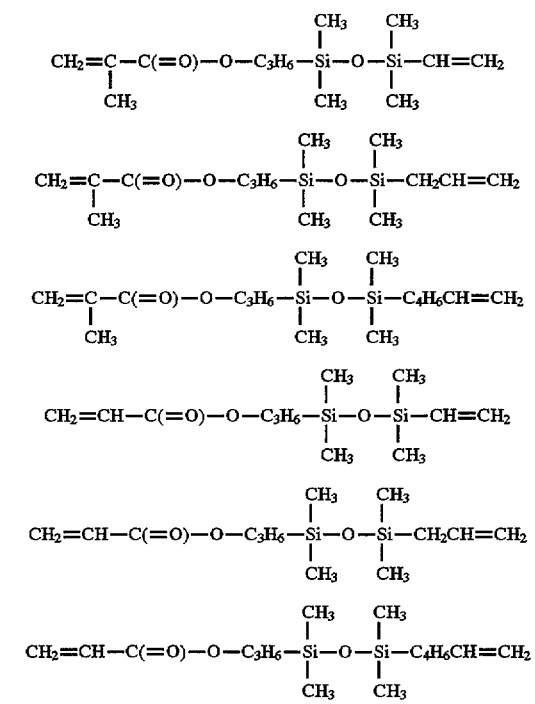

-continued

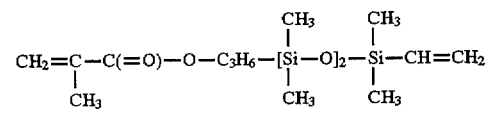
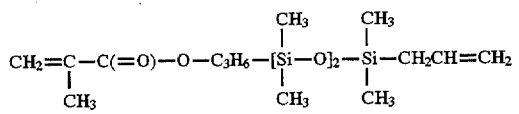
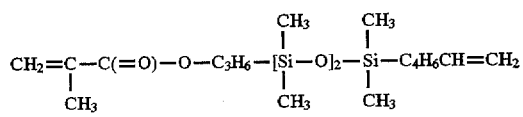
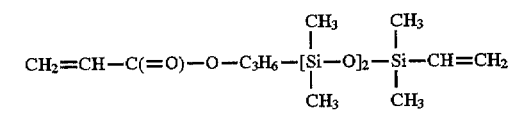
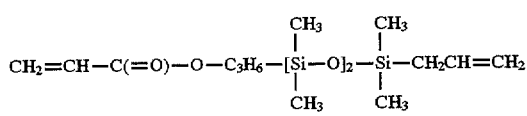
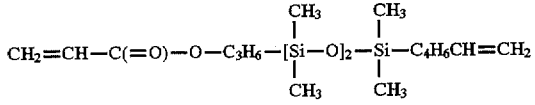

Heterodifunctional oligosiloxane (a') can be prepared, for example, by a condensation reaction between alkenyldialkylmonochlorosilane and acryloxyalkylmonosilanol or methacryloxyalkylmonosilanol.

Preparation of component (A) can also include the copolymerization of various vinyl monomers along with the above-described (meth)acrylic monomer. These vinyl monomers may be exemplified by styrene, butadiene, acrylonitrile, and others.

The polymerization technique for preparing component (A) is not crucial and may be exemplified by radical polymerization, anionic polymerization, cationic polymerization, and group-transfer polymerization.

Component (B) is acrylic resin that contains at least 2 hydrosilyl groups in each molecule. Component (B) must be a solid at ambient temperatures and have a melting-initiation temperature of at least 40° C. Component (B) preferably has a weight-average molecular weight of 500 to 500,000 and more preferably of 5,000 to 100,000. The chemical structure of component (B) may be either straight chain or branched.

The subject acrylic resin can be prepared by the copolymerization of acrylic or methacrylic ("(meth)acrylic") monomer with a heterodifunctional oligosiloxane that carries both (meth)acrylic and SiH functional groups in the same molecule. The (meth)acrylic monomer is preferably the same as used in component (A) as described above, and the use of methacrylic monomers is again preferred. The chemical structure of component (B) is preferably as similar to the chemical structure of component (A) as possible in order to make possible an immediate melt-mixing to homogeneity upon heating at or above the melting-initiation temperature.

The heterodifunctional oligosiloxane (b') may be exemplified by compounds as defined by the following general formula

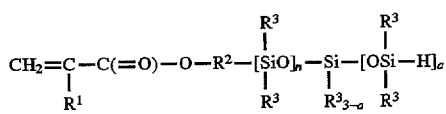

wherein $R^1$ is a hydrogen atom or methyl group; $R^2$ is a divalent hydrocarbon group such as ethylene, propylene, and others; $R^3$ is an alkyl group such as methyl, ethyl, propyl, and others, or an aryl group; n is an integer from 0 to 4; and a is an integer from 1 to 3. Heterodifunctional oligosiloxane (b') may be exemplified by compounds with the following chemical structures:

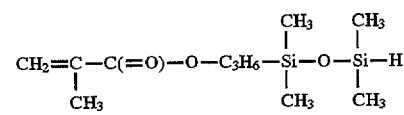
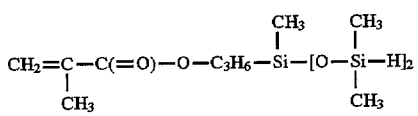
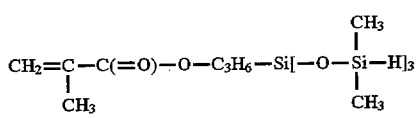
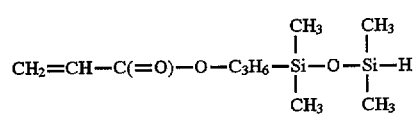
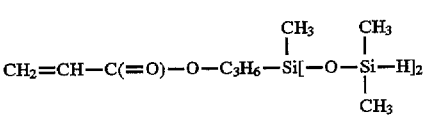
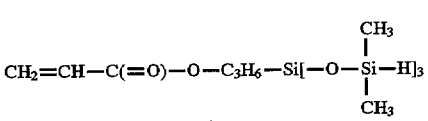
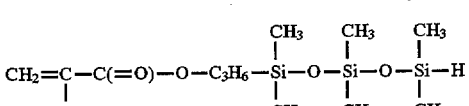
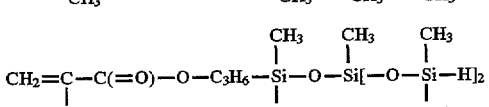
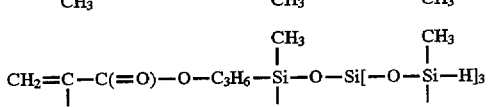
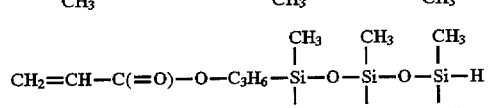
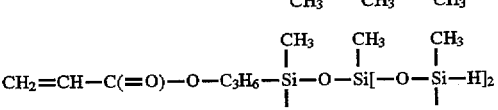

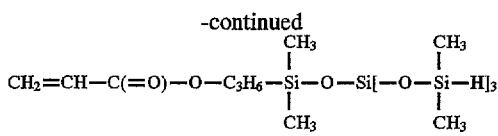

Heterodifunctional oligosiloxane (b') is readily prepared, for example, by a condensation reaction between dialkylmonochlorosilane and acryloxyalkylmonosilanol or methacryloxyalkylmonosilanol. It can also be prepared by the reaction of tetramethyldisiloxane with methacryloxyalkylmethoxysilane according to the method described in U.S. Pat. No. 5,169,909, hereby incorporated by reference.

Preparation of component (B) can also include the copolymerization of various vinyl monomers along with the above-described (meth)acrylic monomer. Said vinyl monomers are exemplified by styrene, butadiene, acrylonitrile, and others.

The polymerization technique for preparing component (B) is not crucial and may be exemplified by radical polymerization, anionic polymerization, cationic polymerization, and group-transfer polymerization.

Component (B) should be added in a quantity that gives a value from 1:0.3 to 1:30 and preferably from 1:0.5 to 1:20 molar ratio of silicon-bonded alkenyl groups in component (A) to silicon-bonded hydrogen in component (B). Curing of the composition according to the present invention will be unacceptable when this molar ratio falls outside the specified range.

The hydrosilylation reaction catalyst (C) is a catalyst that induces the cute of the composition by accelerating the hydrosilylation reaction between the alkenyl groups in component (A) and the silicon-bonded hydrogen in component (B). Catalysts already known as hydrosilylation catalysts can be used. Specific examples the hydrosilylation catalysts include, but are not limited to, platinum compounds such as platinum powder; platinum black; chloroplatinic acid; platinum on a support such as alumina and silica; complexes between chloroptatinic acid and an alcohol, aldehyde or ketone; platinum-olefin complexes; platinum-vinylsiloxane complexes; platinum-phosphine complexes; and others. Other examples besides these platinum compounds are rhodium compounds such as triphenylphosphine complexes of rhodium; palladium compounds such as tetrakis (triphenylphosphine)palladium; compounds of ruthenium, iridium, iron, cobalt, manganese, zinc, lead, aluminum and nickel; and radical initiators such as azo compounds and so forth. These catalysts may be used individually or in combinations of two or more selections. Platinum compounds are preferred for their excellent reactivities. When a platinum catalyst is used as component (C), the platinum catalyst should be added at from 0.01 to 1,000 weight parts and preferably at from 0.1 to 100 weight parts, in each case as platinum metal for each 1,000,000 weight parts of the total amount of components (A) and (B).

The composition according to the present invention comprises (A), (B), and (C), but may in addition contain a hydrosilylation-inhibiting compound for the purpose of improving the storage stability. Said hydrosilylation-inhibiting compounds are exemplified by, but not limited to, phosphorus-containing compounds such as triphenylphosphine; nitrogenous compounds such as tributylamine, tetramethylethylenediamine and benzotriazole; sulfur-containing compounds; acetylenic compounds; compounds bearing at least two alkenyl groups; hydroperoxy compounds; and maleic acid derivatives. Among these, alkenyl-containing compounds and alkynyl-containing compounds are preferred. Particularly preferred are compounds that contain two or more alkynyl groups in each molecule, compounds that contain both alkenyl and alkynyl in each molecule, compounds that contain both alkynyl and alcoholic hydroxyl in each molecule, diesters of maleic acid, and organosilicon compounds that contain a bonding unit in which alkenyl is bonded to each of two silicon atoms lying adjacent to one another across an oxygen atom.

The desirable addition of hydrosilylation-inhibiting compound is 0.1 to 50,000 weight parts for each 1 million weight parts of the total of components (A) and (B). Hydrosilylation inhibition is not obtained when too little is added, while the addition of too much inhibits curing.

In addition to the hydrosilylation-inhibiting compound, the following may be added insofar as the object of the present invention is not impaired: pigment for the purpose of providing color, reinforcing filler for strength improvement, plasticizer in order to improve the processability and hot-meltability, additives for the purpose of raising the thermal conductivity, and filler for the purpose of improving the conductivity.

The composition according to the present invention is prepared by mixing (A), (B), and (C) to homogeneity. Any mixing technique can be used for this purpose. However, inducing the hydrosilylation reaction during mixing must be avoided. For example, acrylic resin that is solid at room temperature can be prepared by mixing component (C) and any optional additives to homogeneity into an organic solvent solution of component (A) or (B) and thereafter eliminating the solvent. The curable resin composition can be prepared, for example, by blending the respective, separately obtained solid acrylic resins in their prescribed quantities.

The curable resin composition according to the present invention is characterized by its ability to rapidly cure at temperatures at or above its melting-initiation temperature through the development of a crosslinking reaction. The curable resin composition is colorless and transparent. At a temperature at or in excess of the melting-initiation temperature, it melts and cures through the immediate, hydrosilylation-based formation of a crosslinked structure to yield resin with an excellent mechanical strength. The curable resin composition according to the present invention is useful as a base resin in reactive hot-melt adhesives.

So that those skilled in the art can understand and appreciate the invention taught herein, the following examples are presented, it being understood that these examples should not be used to limit the scope of this invention found in the claims attached hereto.

Measurement of the melting-initiation temperature

The measurement sample (powder) was introduced into a thin glass melting-point tube, which was placed in an automatic instrument for melting point measurement (Metter FP90, FP81HT, from Nihon Siber Hegner Kabushiki Kaisha). The light transmittance through the sample was measured while the temperature was gradually raised. The melting-initiation temperature was designated as the temperature at which a change in light transmittance occurred due to the start of sample melting.

Synthesis Example 1

The following were introduced into a four-neck flask and mixed: 100.0 g (703 millimoles) n-butyl methacrylate, 11.8 g (41.1 millimoles) 1-methacryloxypropyl-3-vinyltetramethyldisiloxane, and 112 g toluene. This was followed by the addition of 14.7 g azobisisobutyronltrile (89.5 millimoles, 12 mole %) and polymerization for 2 hours at a reaction temperature of 90° C. under a nitrogen blanket. The resulting reaction mixture was cooled and poured into a large volume of methanol to produce a white precipitate. This solid was filtered off on a glass filter and the recovered solid was dissolved in 600 mL acetone. After any gel had been removed by passing the acetone solution through a glass filter, the low boilers were eliminated by stripping on a rotary evaporator. The resulting solid was vacuum-dried at 60° C. to yield 54.2 g of a colorless and transparent acrylic resin. This acrylic resin had a number-average molecular weight of 8,500, a weight-average molecular weight of 22,000, a melting-initiation temperature of 55° C., and a melting range of 55° C. to 117° C. It had a vinyl content of 0.83 weight % and contained an average of approximately 2.6 vinyl Groups per molecule.

Synthesis Example 2

The following were introduced into a four-neck flask and mixed: 100.0 (703 millimoles) n-butyl methacrylate, 16.9 g (44,3 millimoles) methacryloxypropyltris (dimethylhydrogensiloxy) silane, and 117.0 toluene. This was followed by the addition of 9.6 g azobisisobutyronitrile (58.4 millimoles, 8 mole %) and polymerization for 3 hours at a reaction temperature of 90° C. under a nitrogen blanket. The resulting reaction mixture was cooled and poured into a large volume of dimethyl sulfoxide to produce a white precipitate. This solid was filtered off on a glass filter and the recovered solid was dissolved in 600 mL acetone. After any gel had been removed by passing the acetone solution through a glass filter, the low boilers were eliminated by stripping on a rotary evaporator. The resulting solid was vacuum-dried at 60° C. to yield 81.8 g of a colorless and transparent acrylic resin. This acrylic resin had a number-average molecular weight of 4,500, a weight-average molecular weight of 11,000, a melting-initiation temperature of 56° C., and a melting range of 56° C. to 141° C. It had a hydrosilyl content of 0.11 weight % and contained an average of approximately 4.9 silicon-bonded hydrogen per molecule.

EXAMPLE 1

Phenylbutynol, 0.0038 g (600 ppm based on the total acrylic resin) and chloroplatinic acid/tetramethyldivinylsiloxane complex in a quantity sufficient to give 5 ppm platinum metal based on the total acrylic resin were dissolved to homogeneity in 50 mL acetone. Into this solution was then dissolved 5.00 g of the acrylic resin prepared in Synthesis Example 1 (-SiVi=1.56 mmoles). This was followed by the addition of 1.37 g of the acrylic resin prepared in Synthesis Example 2 (-SiH=1.53 mmoles) with mixing to homogeneity. The acetone was then stripped from this acetone solution. The resulting solid was put on a Teflon sheet and then placed under a vacuum at 80° C. This afforded a colorless and transparent sheet of the curable resin composition.

A 10 mm×25 mm×1 mm sample was cut from this curable resin composition sheet and placed between 2 aluminum panels (25 mm×100 mm×2.5 mm). Curing was effected by heating for 10 minutes at 150° C. to yield a test specimen in which the 2 aluminum test panels had been unified into a single body.

When this test specimen was held suspended (fixed at its top end) in a 200° C. oven, the two test panels remained unified in a single body and did not separate. The appearance of the sample of the curable resin composition was unchanged from colorless and transparent.

What is claimed is:

1. A curable resin composition comprising
    (A) an acrylic resin that has at least 2 silicon-bonded alkenyl groups in each molecule and that has a melting-initiation temperature of at least 40° C.;
    (B) an acrylic resin that has at least 2 hydrosilyl groups in each molecule and that has a melting-initiation temperature of at least 40° C., wherein (B) is present in a quantity that yields from 1:0.3 to 1:30 molar ratio of silicon-bonded alkenyl groups in component (A) to silicon-bonded hydrogen atoms in component (B); and
    (C) a hydrosilylation reaction catalyst in sufficient quantity to cure the composition.

2. The curable resin composition as claimed in claim 1 wherein the acrylic resin (A) has a weight-average molecular weight of 500 to 500,000.

3. The curable resin composition as claimed in claim 2 wherein the acrylic resin (A) has a weight-average molecular weight of 5,000 to 100,000.

4. The curable resin composition as claimed in claim 1 wherein the acrylic resin (B) has a weight-average molecular weight of 500 to 500,000.

5. The curable resin composition as claimed in claim 4 wherein the acrylic resin (B) has a weight-average molecular weight of 5,000 to 100,000.

6. The curable resin composition as claimed in claim 1 wherein wherein (B) is present in a quantity that yields from 1:0.5 to 1:20 molar ratio of silicon-bonded alkenyl groups in component (A) to silicon-bonded hydrogen atoms in component (B).

7. The curable resin composition as claimed in claim 1 wherein the hydrosilylation reaction catalyst is selected from the group consisting of platinum compounds; rhodium compounds; palladium compounds; compounds of ruthenium, iridium, iron, cobalt, manganese, zinc, lead, aluminum and nickel; and radical initiators.

8. The curable resin composition as claimed in claim 7 wherein the hydrosilylation reaction catalyst is a platinum compound.

9. The curable resin composition as claimed in claim 8 wherein the platinum compounds are selected from the group consisting of platinum powder; platinum black; chloroplatinic acid; platinum on a support such as alumina and silica; complexes between chloroplatinic acid and an alcohol, aldehyde or ketone; platinum-olefin complexes; platinum-vinylsiloxane complexes; and platinum-phosphine complexes.

10. The curable resin composition as claimed in claim 8 wherein the platinum catalyst should is present in an amount from 0.01 to 1,000 weight parts as platinum metal for each 000,000 weight parts of the total amount of components (A) and (B).

11. The curable resin composition as claimed in claim 10 wherein there is additionally present a hydrosilylation-inhibiting compound in an amount to provide 0.1 to 50,000 weight parts for each 1 million weight parts of (A) and (B).

12. The curable resin composition as claimed in claim in claim 11 wherein the hydrosilylation-inhibiting compound is selected from the group consisting of phosphorus-containing; nitrogenous compounds; sulfur-containing compounds; acetylenic compounds; compounds bearing at least two alkenyl groups; hydroperoxy compounds; and maleic acid derivatives.

13. The curable resin composition as claimed in claim 12 wherein the hydrosilylation-inhibiting compound is a compound bearing at least two alkenyl groups.

* * * * *